United States Patent
Kweon et al.

(10) Patent No.: US 7,138,209 B2
(45) Date of Patent: *Nov. 21, 2006

(54) POSITIVE ACTIVE MATERIAL FOR RECHARGEABLE LITHIUM BATTERY AND METHOD OF PREPARING SAME

(75) Inventors: Ho-Jin Kweon, Cheonan (KR); Joon-Won Suh, Cheonan (KR)

(73) Assignee: Samsung SDI Co., Ltd., Suwon-si (KR)

(*) Notice: Subject to any disclaimer, the term of this patent is extended or adjusted under 35 U.S.C. 154(b) by 19 days.

This patent is subject to a terminal disclaimer.

(21) Appl. No.: 09/897,445

(22) Filed: Jul. 3, 2001

(65) Prior Publication Data

US 2002/0071990 A1    Jun. 13, 2002

(30) Foreign Application Priority Data

Oct. 9, 2000  (KR) ............................... 2000-59336
May 15, 2001  (KR) ............................... 2001-26468

(51) Int. Cl.
*H01M 4/50*    (2006.01)
*H01M 4/52*    (2006.01)
*C01B 35/10*   (2006.01)
*C01G 51/04*   (2006.01)
*C01G 45/02*   (2006.01)

(52) U.S. Cl. ............................... 429/231.1; 429/231.3; 423/283; 423/594.6; 423/599

(58) Field of Classification Search ............. 429/218.1, 429/223, 224, 231.1, 231.3, 231.95; 423/283, 423/629, 594.4, 594.6
See application file for complete search history.

(56) References Cited

U.S. PATENT DOCUMENTS

| | | |
|---|---|---|
| 5,292,601 A | 3/1994 | Sugeno et al. |
| 5,705,291 A | 1/1998 | Amatucci et al. |
| 5,783,328 A | 7/1998 | Wang |
| 6,183,911 B1 | 2/2001 | Kweon et al. |
| 6,372,385 B1 | 4/2002 | Kweon et al. |
| 6,531,220 B1 | 3/2003 | Kweon et al. |
| 6,653,021 B1 | 11/2003 | Kweon et al. |
| 6,753,111 B1 | 6/2004 | Kweon et al. |

(Continued)

FOREIGN PATENT DOCUMENTS

CN    1227672 A    9/1999

(Continued)

*Primary Examiner*—Jonathan Crepeau
(74) *Attorney, Agent, or Firm*—Stein, McEwen & Bui, LLP

(57) ABSTRACT

Disclosed is a positive active material for a rechargeable lithium battery. The positive active material includes a core and a surface-treatment layer on the core. The core includes at least one lithiated compound and the surface-treatment layer includes at least one coating material selected from the group consisting of coating element included-hydroxides, oxyhydroxides, oxycarbonates, hydroxycarbonates and any mixture thereof.

4 Claims, 13 Drawing Sheets

U.S. PATENT DOCUMENTS

| | | |
|---|---|---|
| 6,756,155 B1 | 6/2004 | Kweon et al. |
| 6,797,435 B1 | 9/2004 | Kweon et al. |
| 6,818,349 B1 * | 11/2004 | Choi et al. ............... 429/218.1 |
| 6,846,592 B1 * | 1/2005 | Kweon et al. .......... 429/231.95 |
| 6,972,134 B1 | 12/2005 | Kweon et al. |
| 6,974,486 B1 | 12/2005 | Kweon et al. |
| 6,974,601 B1 | 12/2005 | Kweon et al. |
| 6,984,469 B1 | 1/2006 | Kweon et al. |
| 2002/0110736 A1 * | 8/2002 | Kweon et al. ............ 429/231.1 |
| 2002/0142224 A1 * | 10/2002 | Kweon et al. .......... 429/231.95 |
| 2003/0003352 A1 * | 1/2003 | Kweon et al. ............... 429/137 |
| 2003/0054250 A1 * | 3/2003 | Kweon et al. ............ 429/231.1 |
| 2003/0073004 A1 * | 4/2003 | Kweon et al. .......... 429/231.95 |
| 2003/0082442 A1 * | 5/2003 | Choi et al. .................. 429/137 |
| 2004/0018429 A1 | 1/2004 | Kweon et al. |
| 2005/0053718 A1 | 3/2005 | Choi et al. |

FOREIGN PATENT DOCUMENTS

| | | | |
|---|---|---|---|
| CN | 1228620 A | | 9/1999 |
| JP | 09-055210 | | 2/1997 |
| JP | 09-171813 | * | 6/1997 |
| JP | 11-016566 | | 1/1999 |
| JP | 11-97027 | | 4/1999 |
| JP | 11-185758 | | 7/1999 |
| KR | 10-0277796 | | 10/2000 |
| WO | WO 00/70694 | | 11/2000 |

* cited by examiner

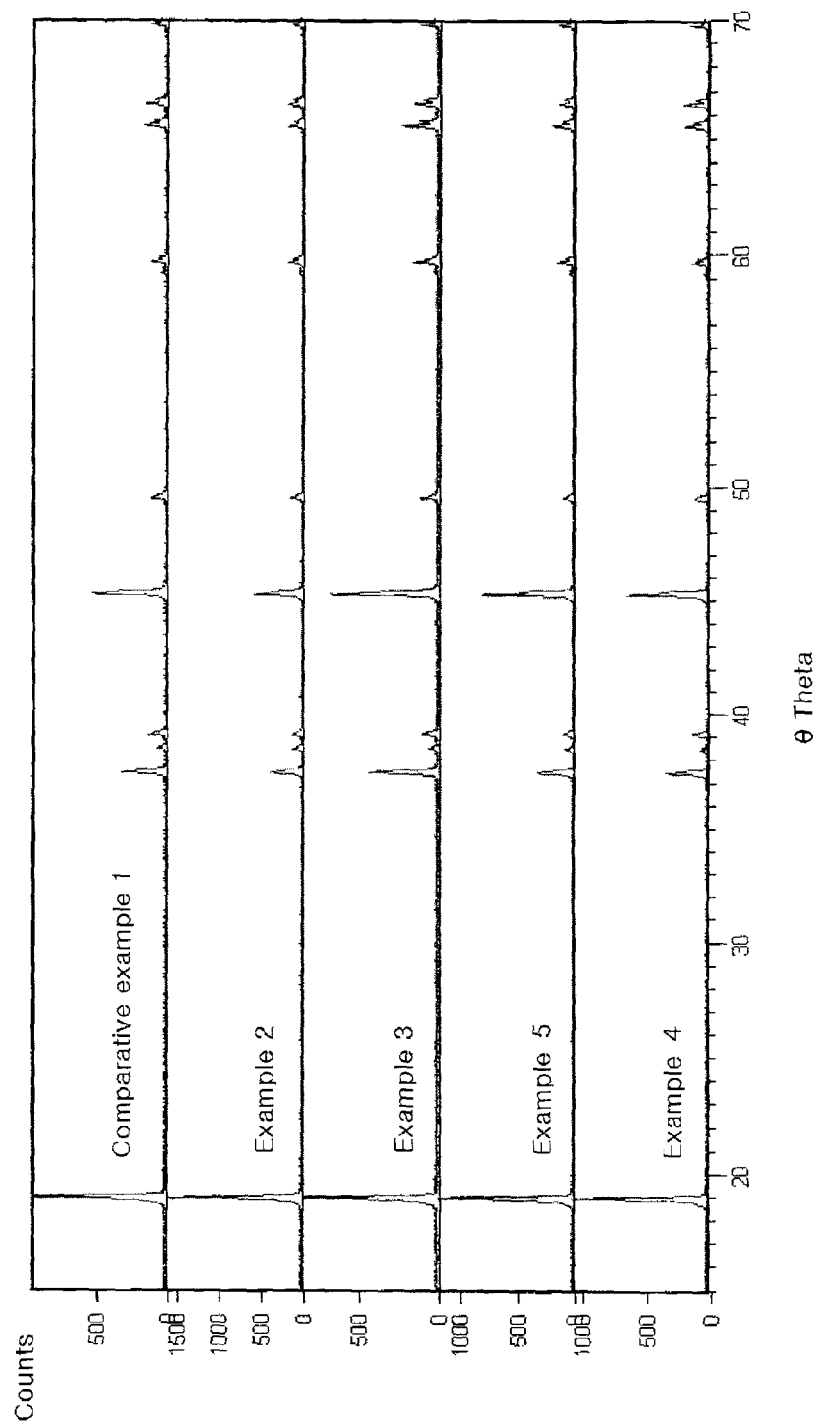

JCPDS Card No 02-1373 (Al₂O₃)  JCPDS Card No 83-2256 (Al(OH)₃)

POSITIVE ACTIVE MATERIAL FOR RECHARGEABLE LITHIUM BATTERY AND METHOD OF PREPARING SAME

CROSS REFERENCE TO RELATED APPLICATION

This application is based on application Nos. 2000-59336 and 2001-26468 filed in the Korean Industrial Property Office on Oct. 9, 2000 and May 15, 2001, the contents of which are incorporated hereinto by reference.

BACKGROUND OF THE INVENTION (a) Field of the Invention

The present invention relates to a positive active material for a rechargeable lithium battery and a method of preparing the same, and, more particularly, to a positive active material for a rechargeable lithium battery exhibiting good electrochemical properties such as cycle life, high discharge potential, high power density and improved thermal stability characteristics.

(b) Description of the Related Art

Rechargeable lithium batteries have high average discharge potential of about 3.7V and are 4V-grade batteries. The rechargeable lithium batteries are widely used for cellular phones, notebook computers, or camcorders, which are also known as "the 3 Cs", and are main components in the digital world.

The rechargeable lithium batteries use a material from or into which lithium ions are deintercalated or intercalated as positive and negative active materials. For an electrolyte, an organic solvent or polymer is used. Rechargeable lithium batteries produce electric energy as a result of changes in the chemical potentials of the active materials during the intercalation and deintercalation reactions of lithium ions.

For the negative active material in a rechargeable lithium battery, metallic lithium has been used in the early days of development. Recently, however, carbon materials, which intercalate lithium ions reversibly, are extensively used instead of the metallic lithium due to problems of high reactivity toward electrolyte and dendrite formation of the metallic lithium. With the use of carbon-based active materials, the potential safety problems that are present in batteries with the metallic lithium can be prevented while achieving relatively higher energy density, as well as much improved cycle life. In particular, boron is added to carbonaceous materials to produce boron-coated graphite (BOC) in order to increase the capacity of the carbonaceous materials.

For the positive active material in the rechargeable lithium battery, chalcogenide compounds into or from which lithium ions are intercalated or deintercalated are used. Typical examples include $LiCoO_2$, $LiMn_2O_4$, $LiNiO_2$, $LiNi_{1-x}Co_xO_2(0<X<1)$ or $LiMnO_2$. Manganese-based materials such as $LiMn_2O_4$ or $LiMnO_2$ are the easiest to prepare, are less expensive than the other materials, and are environmentally friendly. However, manganese-based materials have a low capacity. $LiNiO_2$ is inexpensive and has a high charge capacity, but is difficult to produce. $LiCoO_2$ is relatively expensive, but widely used as it has good electrical conductivity and high battery voltage. Most rechargeable lithium batteries (about at least 95%) employ $LiCoO_2$.

Although $LiCoO_2$ exhibits good cycle life characteristics and good flat discharge profiles, there are still demands to improve electrochemical properties such as good cycle life and high power density.

One way to satisfy such a demand is to substitute a part of the Co from $LiCoO_2$ with other metals. Sony prepares $Li_xCo_{1-y}M_yO_2$ by doping about 1 to 5 percent by weight of $Al_2O_3$ into $LiCoO_2$. A&TB (Ashai & Thosiba Battery Co.) prepares a Sn-doped Co-based active material by substituting a part of Co from $LiCoO_2$ with Sn.

Another way is that a lithiated compound is coated with a coating material.

U.S. Pat. No. 5,292,601 discloses $Li_xMO_2$ (M is at least one element selected from Co, Ni or Mn; x is 0.5 to 1). U.S. Pat. No. 5,705,291 discloses a method in which a coating material is mixed with a lithiated intercalation compound, and the mixture is annealed at 400° C. or more to coat the compound with the coating material. The coating material is selected from boron oxide, boric acid, lithium hydroxide, aluminum oxide, lithium aluminate, lithium metaborate, silicon dioxide, lithium silicate or mixtures thereof.

Japanese Patent Laid-Open No. Hei 9-55210 discloses that lithium nickel-based oxide is coated with alkoxide of Co, Al and Mn and heat-treated to prepare a positive active material. Japanese Patent Laid-Open No. Hei 11-16566 discloses lithium-based oxide coated with a metal and/ or an oxide thereof. The metal includes Ti, Sn, Bi, Cu, Si, Ga, W, Zr, B or Mn. Japanese Patent Laid-Open No. 11-185758 discloses coating a surface of lithium manganese oxide with metal oxide by using a co-precipitation procedure and heat-treating the same to prepare a positive active material.

Even though these studies have progressed, there are still demands for improving electrochemical properties such as high capacity, long cycle life, high power density and exhibiting good thermal stability. In addition, much research is being conducted on thermal stability of positive active materials to ensure stability and reliability of batteries under abusive condition such as heat-exposure, firing or overcharging.

SUMMARY OF THE INVENTION

It is an object of the present invention to provide a positive active material for a rechargeable lithium battery exhibiting good electrochemical properties such as good cycle life, high discharge potential and high power density.

It is another object to provide the positive active material for a rechargeable lithium battery with good thermal stability.

It is still another object to provide a method of preparing the same with an economical means.

These and other objects may be achieved by a positive active material for a rechargeable lithium battery including a core and a surface-treatment layer on the core. The surface-treatment layer includes at least one coating material selected from the group consisting of coating element included-hydroxides, -oxyhydroxides, -oxycarbonates, -hydroxycarbonates and any mixture thereof, and preferably coating element included-hydroxide or -oxyhydroxide. The coating element included -hydroxide, -oxyhydroxide, -oxycarbonate, -hydroxycarbonate or any mixture thereof may have amorphous form or crystalline form.

In order to achieve these objects and others, the present invention provides a method of preparing a positive active material for a rechargeable lithium battery. In this method, at least one lithiated compound is coated with an organic solution of a coating material source or an aqueous solution of a coating material source, and the coated compound is then dried.

BRIEF DESCRIPTION OF THE DRAWINGS

A more complete appreciation of the invention, and many of the attendant advantages thereof, will be readily apparent as the same becomes better understood by reference to the following detailed descriptions when considered in conjunction with the accompanying drawings, wherein:

FIG. 7 is a graph illustrating the X-ray diffraction (XRD) pattern of positive active materials according to Examples 2 to 5 and Comparative example 1 of the present invention;

DETAILED DESCRIPTION OF THE INVENTION

Figure 1:
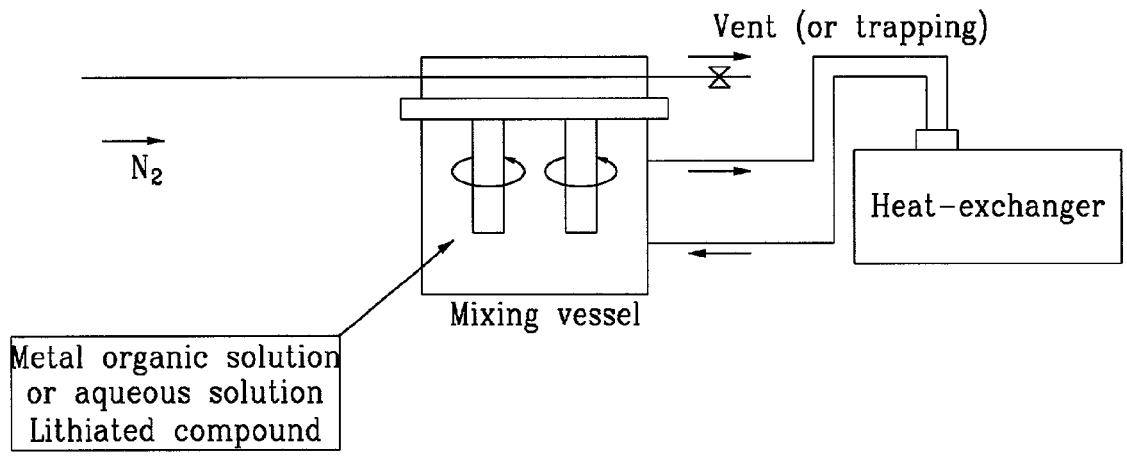
FIG. 1 is a schematic diagram showing an apparatus used in a coating step of the present invention.

The present invention is an improvement of Korean Patent Application No. 98-42956, which is assigned to the assignee of the present invention and which discloses a positive active material coated with metal oxide.

A positive active material of the present invention includes a core and a surface-treatment layer. The surface-treatment layer includes at least one compound selected from the group consisting of coating element included-hydroxides, -oxyhydroxides, -oxycarbonates, -hydroxycarbonates and any mixture thereof (hereinafter, referred to as "coating material"). The surface-treatment layer preferably includes coating element included-hydroxide or -oxyhydroxide. The coating material may have amorphous or crystalline form.

The coating element in the coating material may be any element which is capable of dissolving in organic solvents or water. Examples are Mg, Al, Co, K, Na, Ca, Si, Ti, V, Sn, Ge, Ga, B, As, Zr, or any mixture thereof. The content of the coating element of the coating material is preferably $2 \times 10^{-5}$ to 2 percent by weight based on the weight of the positive active material, and more preferably 0.001 to 2 percent by weight.

The surface-treatment layer preferably has a thickness in the range of 0.1 to 300 nm, more preferably in the range of 0.1 to 100 nm, and most preferably in the range of 0.1 to 50 nm.

The core includes at least one lithiated compound, and preferably includes at least one lithiated compound represented by the formulas 1 to 11,

  (1)

  (2)

  (3)

  (4)

  (5)

  (6)

  (7)

  (8)

  (9)

  (10)

  (11)

where $0.95 \leq x \leq 1.1, 0 \leq y \leq 0.5, 0 \leq z \leq 0.5, 0 \leq \alpha \leq 2$, M is Ni or Co, M' is at least one element selected from the group consisting of Al, Ni, Co, Cr, Fe, Mg, Sr, V, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No and Lr, M″ is at least one element selected from the group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No and Lr, A is selected from the group consisting of O, F, S and P, and X is selected from the group consisting of F, S and P.

According to one Example of the present invention, the core includes lithium-cobalt chalcogenide compounds and the surface-treatment layer includes AlO(OH) or Al(OH)$_3$ According to another Example of the present invention, the core includes lithium-manganese or lithium-cobalt chalcogenide compound and the surface-treatment layer include HB(OH)$_2$.

The positive active material of the present invention exhibits improved electrochemical properties in cycle life, discharge potential, power density and good thermal stability, compared with conventional LiCoO$_2$ or LiNi$_{1-x-y}$M$_x$N$_y$O$_2$ which is commercially available.

A positive active material preparation will now be illustrated in more detail.

At least one lithiated compound is coated (encapsulated) with an organic solution or an aqueous solution of coating material source (hereinafter, referred to as "coating solution").

The coating solution is obtained by dissolving a coating material source in organic solvents or water, and preferably refluxing the resulting mixture. The coating material source includes a coating element or, a coating element included-alkoxide, -salt or -oxide of the coating element. Suitable coating material source may be chosen from the coating element, the coating element included-alkoxide, -salt or -oxide according to the type of the solvent, which is well known to one skilled in the related arts. For example, if the organic solvents are used for the solvents, then the coating element, the coating element included-alkoxide, -salt or -oxide may be used for the coating material source, and if water is used for the solvents, then the coating element included-salt or -oxide may be used for the coating material source.

The coating element in the coating material source may be any element which is capable of dissolving in organic solvents or water. Examples are Mg, Al, Co, K, Na, Ca, Si, Ti, V, Sn, Ge, Ga, B, As, Zr, or any mixture thereof.

Useful organic solvents include hexane, chloroform, tetrahydrofuran, ether, methylene chloride, acetone, or alcohols such as methanol, ethanol or isopropanol.

An exemplary organic solution is a coating element-included alkoxide solution. The alkoxide solution may be prepared by dissolving the coating element in an alcohol such as methanol, ethanol or isopropanol, and refluxing them, or by dissolving a coating element-included alkoxide such as methoxide, ethoxide or isopropoxide in alcohol. For example, tetraethylorthosilicate solution is prepared by dissolving silicate in ethanol. The organic solution or aqueous solution may also be available through commercial purchase. A boron solution may be prepared by dissolving B$_2$O$_3$ or H$_3$BO$_3$ in organic solvents or water. Alternatively, a boron solution may be prepared by dissolving HB(OH)$_2$ in organic solvents or water. HB(OH)$_2$ may be obtained by dissolving B$_2$O$_3$ in organic solvents or water and by drying.

Useful salts or oxides include a form of vanadate, such as ammonium vanadate (NH$_4$(VO)$_3$) or vanadium oxide (V$_2$O$_5$).

The concentration of coating material source in the coating solution may be 0.1 to 50 percent by weight based on the coating solution, and preferably 5 to 30 percent by weight. When the concentration thereof is below 0.1 percent by weight, the effect obtained by coating the solution onto the lithiated compound may not be sufficient. In contrast, when the concentration of coating material source is more than 50 percent by weight, the resultant coating layer may become undesirably thick.

The coating process may be performed by a sputtering method, a chemical vapor deposition (CVD) method, an impregnation method such as dip coating, or by using any other general-purpose coating technique. Any other coating techniques, if available and applicable, may be as effective as the methods described herein. A common method of the coating process is impregnating the lithiated compound in the solution. The impregnating methods include one where the lithiated material is mixed with the coating solution (mixing step), and the resulting lithiated material is then separated from the solution (solvent-removing step).

Thereafter, the coated powder may be dried from room temperature to about 200° C. for approximately 1 to 24 hours.

Alternatively, the coating process may be a one-shot process where a mixing step, a solvent-removing step and a drying step take place in a single process vessel. This one-shot process is simple, thereby reducing the production cost and making a uniform surface-treatment layer on a core.

The one-shot process may be performed such that at least one lithiated compound and the coating solution is injected into a mixer and the temperature of the mixer is raised while shaking the mixer. Additionally, blowing gas may be injected into the mixer. The blowing gas helps to facilitate evaporation of a solvent in the coating solution and to purge impure gases that are present in the mixer. The blowing gas may include CO$_2$ and moisture-free inert gas, such as nitrogen gas or argon gas. Alternatively, the one-shot process may be performed under a vacuum rather than using blowing gas.

While the coating solution is coated on the lithiated compound, excess coating solution may be evaporated and removed by increasing the ambient temperature and mixing. Thus, the mixing step, the solvent removing step, and the drying step are performed in a single mixer vessel.

The increase in the temperature of the mixer may be achieved by circulating hot water around the mixer. The hot water has a temperature at which the organic solvent or water is evaporated, preferably about 50 to 100° C. The hot water may be cooled by circulating it around the mixer. The cooled water may be heated by a heat exchanger, at which time and the heated water may then be re-circulated.

The mixer may be any mixer so long as the lithiated compound and the coating solution are well mixed and the temperature of the mixer is raised during the mixing process.

FIG. 1 presents a mixer with a heat exchanger. As shown in FIG. 1, nitrogen gas (blowing gas) is injected into the upper portion of the mixer while the hot water is circulated through the heat exchanger around the mixer.

If the one-shot process is performed, the drying step may be simultaneously performed with the coating step, thus the eliminating the requirement of the additional drying step. As a result, the coating element-containing organic solution or coating element-containing aqueous solution is converted into hydroxide, oxyhydroxide, oxycarbonate, hydroxycarbonate, or a mixture thereof, by varying the drying atmosphere. For example, when the drying step is performed under a carbon dioxide atmosphere, oxycarbonate or hydroxycarbonate is formed. In this way, a surface-treatment layer-coated active material is prepared.

The surface-treatment layer preferably has a thickness of about 0.1 to 300 nm, more preferably 0.1 to 100 nm, and most preferably 0.1 to 50 nm. While other thicknesses are possible, if the thickness of the surface-treatment layer is less than 0.1 nm, the effect obtained from the surface-treatment layer may not be realized. In contrast, if the thickness is more than 300 nm, the surface-treatment layer may become undesirably thick reducing specific energy of the active material.

The content of coating element in the surface-treatment layer is preferably about $2 \times 10^{-5}$ to 2 percent by weight based on the weight of the positive active material, and more preferably 0.001 to 2 percent by weight. This content of coating element may be theoretically obtained from knowledge regarding the coating material source added to the lithiated compound, or substantially obtained by measuring it with the general quantitative analysis procedure, such as the ICP method.

Figure 2:
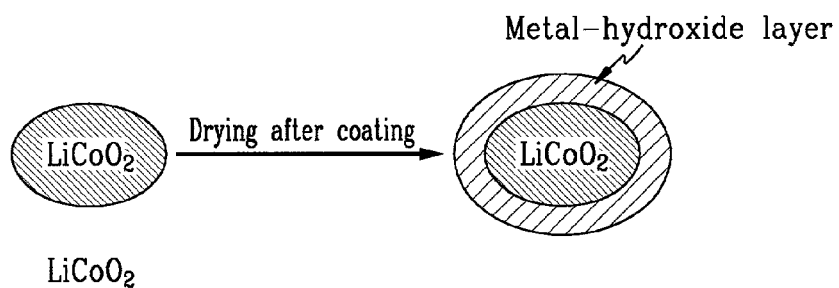
FIG. 2 is a schematic diagram illustrating a production process of a positive active material with $LiCoO_2$ according to the present invention.
Figure 3:
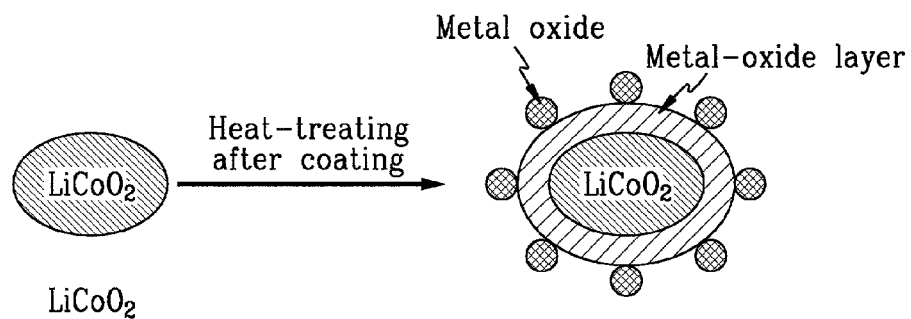
FIG. 3 is a schematic diagram illustrating a production process of a positive active material with $LiCoO_2$ according to the conventional procedure.

The forming procedure of the surface-treatment layer including coating element-included hydroxide on $LiCoO_2$ is schematically illustrated in FIG. 2. This inventive procedure includes the mixing step and the drying step. The conventional procedure for forming a metal oxide layer on $LiCoO_2$ by the heat-treating step, in contrast, is schematically illustrated in FIG. 3. The conventional procedure includes the mixing step, the drying step, and the heat-treating step. As shown in FIGS. 2 and 3, whether the heat-treating step is performed or not, the type of material on the surface of $LiCoO_2$ is changed.

When the heat-treating step is performed, a metal oxide layer is formed on the core. The metal oxide layer has relatively low ionic conductivity, which causes the internal resistance to increase and the discharge potential and power density to deteriorate.

On the other hand, when the heat-treating step is not performed, a surface-treatment layer including coating element-included hydroxide, oxyhydroxide, oxycarbonate, hydroxycarbonate or a mixture thereof is formed on the core. The surface-treatment layer reduces the internal resistance and prevents the discharge potential drop so that the active material exhibits high discharge potential. As a result, the positive active material of the present invention provides good cycle life characteristics, discharge potential, and power, and it also exhibits superior charge and discharge characteristics as compared to that of metal oxide-coated positive active material.

Figure 4:
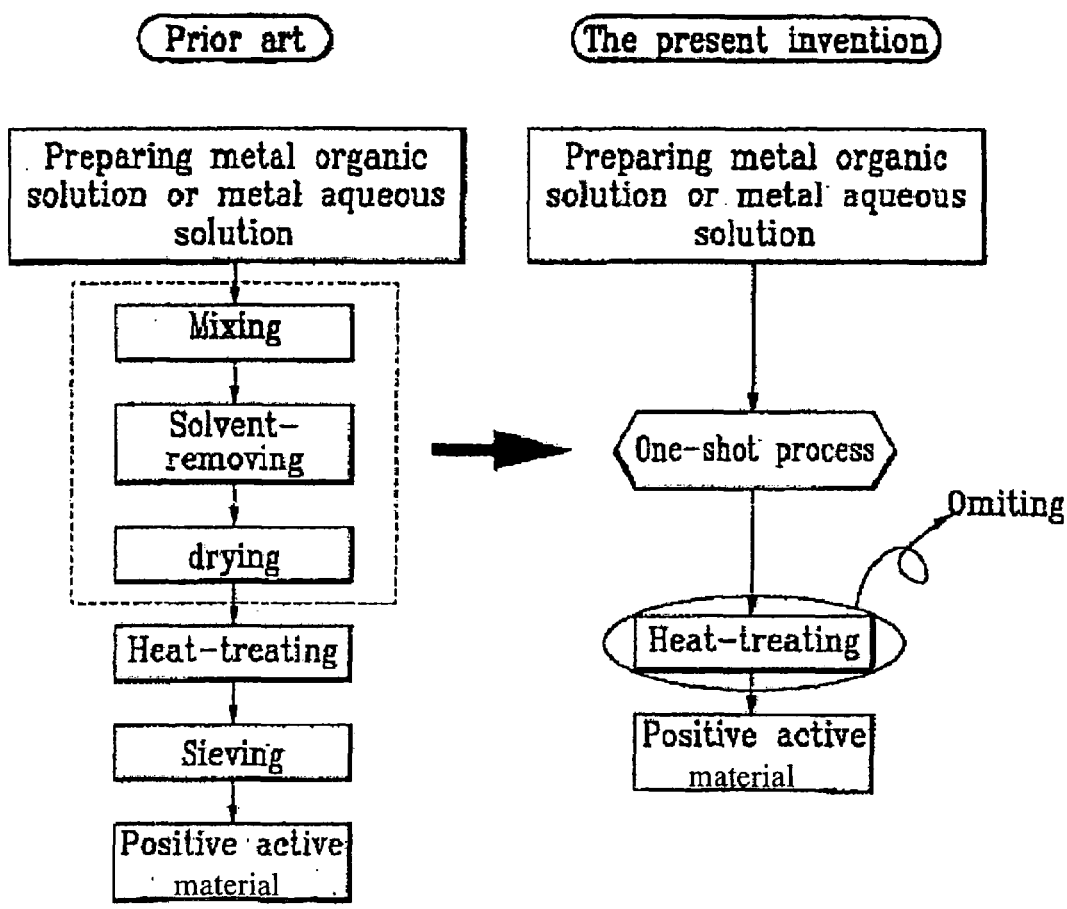
FIG. 4 is a block diagram illustrating an inventive procedure with a one-shot process and the conventional procedure.

For reference purposes, the one-shot process is compared with the conventional process below, and their procedures are illustrated in FIG. 4. As shown in FIG. 4, the conventional coating process is such that the coating element-containing organic solution or aqueous solution is mixed with the lithiated compound to make a slurry (mixing step). The resulting lithiated compound is separated from the solution (solvent removing step), the separated lithiated compound is dried, perhaps at 80 to 100° C. (drying step), and then the dried compound is heat-treated.

The inventive procedure, also shown in FIG. 4, includes a one-shot process (including the mixing step, the solvent removing step and the drying step in a single vessel) so that the total procedure is simple and economical. Furthermore, this procedure uniformly coats the lithiated compound with the coating element-containing organic solution or aqueous solution.

The positive active material preparation of the present invention includes no heat-treating step so that the total required time for preparing positive active material is reduced and the cost for the heat-treating step is eliminated. Accordingly, the preparation of the present invention has high productivity and is less expensive than the conventional procedure involving the heat-treating step. Furthermore, because the present invention includes no heat-treating step, the coating element included-hydroxide, -oxyhydroxide, -oxycarbonate, -hydroxycarbonate or any mixture thereof is formed without being transformed to their corresponding oxides on the surface of the active material.

In order to separate particles with desirable average diameter, the positive active material powder may or may not be sieved. Where there is no sieving, the same material that is included in the surface-treatment layer remains in the positive active material slurry. The material in the slurry improves the thermal stability of the positive electrode.

In order to be marketable, batteries should pass various stability tests. The penetration test in which a nail is passed through a charged battery, is critical for guaranteeing the stability of the battery. The stability of the battery depends on various factors, especially exothermic reaction caused by reacting the charged positive electrode with electrolyte immersed in the charged positive electrode.

For example, when a coin cell with a $LiCoO_2$ active material is charged to a pre-determined potential, $LiCoO_2$ is converted to $Li_{1-x}CoO_2$. The differential scanning calorimetry (DSC) result of the charged active material. $Li_{1-x}CoO_2$, has been expected to provide thermal stability of the active material. Namely, the thermal stability of the positive active material is evaluated by knowing the temperature at which exothermic peak occurs, the quantity of heat evolved and the exothermic peak obtained from the DSC. Because the $Li_{1-x}CoO_2$ active material is unstable, oxygen, bonded with metal (Co—O), decomposes according to increases in temperature in order to release oxygen. The released oxygen may react with an electrolyte in a cell to cause the cell to explode. Accordingly, the temperature and the quantity of heat evolved when oxygen is decomposed significantly affect the stability of the cell.

The positive active material of the present invention has about 230° C. or more of the exothermic temperature, which is 30° C. higher than that of the positive active material without the surface-treatment layer. Furthermore, the positive active material of the present invention has a small quantity of heat evolved during the exothermic reaction. Thus, the positive active material of the present invention exhibits superior thermal stability.

The lithiated compound may be available commercially or may be produced by the following procedure.

Lithium sources are mixed with metal sources in a desirable ratio. The lithium source may be any material known in the related art, some of which include lithium nitrate, lithium acetate, and lithium hydroxide. For the metal sources, manganese sources, cobalt salts, nickel sources, or nickel-cobalt sources may be used. Typical examples of the manganese sources are manganese acetate and manganese dioxide. Typical examples of the cobalt sources are cobalt hydroxide, cobalt nitrate and cobalt carbonate, whereas typical examples of the nickel sources are nickel hydroxide, nickel nitrate, and nickel acetate. The nickel-manganese sources are produced by co-precipitating nickel and manganese salts. Fluoride sources, sulfur sources or phosphorous sources may be further used together with the manganese sources, cobalt sources, nickel sources or nickel-cobalt sources. The fluoride sources may be manganese fluoride or lithium fluoride and the sulfur sources may be manganese sulfide or lithium sulfide. The phosphorous sources may be $H_3PO_4$. Note that the above list of manganese, cobalt, nickel, nickel-manganese, fluoride, sulfur and phosphorus sources is not an exclusive list.

At this time, in order to facilitate the reaction of the lithium sources and the metal sources, a solvent is added to the mixture. The solvent may be ethanol, methanol, water or acetone. The mixture is then mortar grinder mixed until a liquid-free condition is reached.

The resulting mixture is heat-treated (the first heat-treating step) at about 400 to 600° C. to produce a semi-crystalline positive active material precursor powder. Although other temperatures are possible, if the first heat-treating step temperature is less than 400° C., the metal sources may not react completely with the lithium sources. Thereafter, the heat-treated active material precursor powder is dried under dry air or oxygen, and the precursor powder is remixed to uniformly distribute the lithium sources. Alternatively, the remixing step may be performed immediately after the heat-treating step.

The semi-crystalline precursor powder is again heat-treated (the second heat-treating step) at about 700 to 900° C. for about 10 to 15 hours to produce a crystalline positive active material. As described above, if the first heat-treating step temperature is less than 400° C., the lithium sources may not completely react with the metal sources. If the second heat-treating step temperature is less than 700° C., it may be difficult to form a crystalline material. The heating step may be performed by increasing the temperature at a rate of 1 to 5° C./min under dry air. The mixture is allowed to stand at the first and second heat-treating temperature for predetermined amounts of time, and then mixture is naturally cooled. As a result, a powder of a compound selected from the group consisting of the compounds represented by formulas 1 to 11 is obtained.

Thereafter, the compounds represented by formulas 1 to 11 are shaken at room temperature to uniformly distribute the lithium sources.

The following examples further illustrate the present invention.

COMPARATIVE EXAMPLE 1

A $LiCoO_2$ with an average diameter of 10 μm, positive active material, a carbon conductive agent and a polyvinylidene fluoride binder were mixed in N-methyl pyrrolidone to make a positive active material slurry. The positive active material slurry is cast on an Al-foil with a thickness of about 100 μm to make a positive electrode. The positive electrode was punched at a diameter of 1.6 cm. Using the punched positive electrode, a coin-type half-cell was fabricated in a globe-box. For an electrolyte, 1 M $LiPF_6$ in ethylene carbonate and dimethyl carbonate (1/1 volume ratio) was used and for a counter electrode, a lithium metal foil was used.

COMPARATIVE EXAMPLE 2

A coin-type half-cell was fabricated by the same procedure as in Comparative example 1, except that $LiMn_2O_4$ with an average diameter of 15 μm was used.

COMPARATIVE EXAMPLE 3

A coin-cell was fabricated by the same procedure as in Comparative example 1, except that $LiNi_{0.9}Sr_{0.002}Co_{0.1}O_2$ positive active material was used.

COMPARATIVE EXAMPLE 4

One percent by weight of Al-isopropoxide was dissolved in 99 percent by weight of ethanol to prepare a 1% Al-isopropoxide ethanol solution. To the ethanol solution, $LiCoO_2$ with an average diameter of 10 μm was added. Then they were well mixed to sufficiently react the ethanol solution with $LiCoO_2$. The resulting material was separated from the solution and then dried at 100° C. for about 12 hours in an oven. The dried material was heat-treated at about 500° C. for approximately 10 hours under dry air. As a result, a positive active material with an $Al_2O_3$ surface layer was prepared.

Using the positive active material, a coin-type half-cell was fabricated by the same procedure in Comparative example 1.

COMPARATIVE EXAMPLE 5

A coin-type half-cell was fabricated by the same procedure in Comparative example 4, except that 5% Al-isopropoxide ethanol solution was used and the heat-treatment was performed at 600° C.

COMPARATIVE EXAMPLE 6

A coin-type half-cell was fabricated by the same procedure in Comparative example 4, except that $LiNi_{0.9}Sr_{0.002}Co_{0.1}O_2$ positive active material was used.

COMPARATIVE EXAMPLE 7

A coin-type half-cell was fabricated by the same procedure in Comparative example 4, except that 5% Al-isopropoxide ethanol solution and $LiNi_{0.9}Sr_{0.002}Co_{0.1}O_2$ positive active material were used.

COMPARATIVE EXAMPLE 8

A coin-type half-cell was fabricated by the same procedure in Comparative example 4, except that the heat-treatment was performed at 600° C.

EXAMPLE 1

One percent by weight of Al-isopropoxide powder was dissolved in 99 percent by weight of ethanol to prepare a 1% Al-isopropoxide solution.

The Al-isopropoxide solution and $LiCoO_2$ with an average diameter of 10 μm were injected into a mixer shown in FIG. 1 and they were mixed for about 10 minutes. The temperature of an incubator was set to about 60° C., and the mixing step was performed for about 1 hour while the water was circulating and $N_2$ gas was purging. As a result, $LiCoO_2$ positive active material powder with $Al(OH)_3$ surface layer was prepared.

The positive active material powder, a carbon conductive agent, and a polyvinylidene fluoride binder were mixed in a N-methyl pyrrolidone solvent at a ratio of 94:3:3 to make a positive active material slurry. The positive active material slurry was cast on an Al-foil with a thickness of about 100 μm to make a positive electrode. The positive electrode was punched with a diameter of 1.6 cm. Using the positive electrode, a coin-type half-cell was fabricated in a glove-box. For an electrolyte, 1M $LiPF_6$ in ethylene carbonate and dimethyl carbonate (1/1 volume ratio) was used, and for a counter electrode, lithium metal was used.

EXAMPLE 2

One percent by weight of Al-isopropoxide was dissolved in 99 percent by weight of ethanol to prepare a 1% Al-isopropoxide ethanol solution. To the ethanol solution, $LiCoO_2$ with an average diameter of 10 μm was added. Then they were well mixed to sufficiently react the ethanol solution with $LiCoO_2$. The resulting material was separated from the solution and then dried at about 100° C. for about 12 hours in an oven to prepare a positive active material.

Using the positive active material, a coin-type half-cell was fabricated by the same procedure in Example 1.

EXAMPLE 3

A coin-type half-cell was fabricated by the same procedure in Example 2, except that a 5% Al-isopropoxide solution was used.

EXAMPLE 4

A coin-type half-cell was fabricated by the same procedure in Example 2, except that 10% Al-isopropoxide solution was used.

EXAMPLE 5

A coin-type half-cell was fabricated by the same procedure in Example 2, except that a $Al(OH)_3$ coated $LiCoO_2$ positive active material was prepared by using a 10% Al-isopropoxide solution followed by passing it through a 325 mesh (44 μm) screen to collect a powder with an average diameter of less than 44 μm.

EXAMPLE 6

A coin-type half-cell was fabricated by the same procedure in Example 2, except that $LiNi_{0.9}Sr_{0.002}Co_{0.1}O_2$ was used instead of $LiCoO_2$.

EXAMPLE 7

A coin-type half-cell was fabricated by the same procedure in Example 2, except that $LiNi_{0.9}Sr_{0.002}Co_{0.1}O_2$ was coated with a 5% Al-isopropoxide solution.

EXAMPLE 8

A coin-type half-cell was fabricated by the same procedure in Example 2, except that a 1% aluminum nitrate solution prepared by adding $Al(NO_3)_3$ in water was used and the drying step was performed in an oven at about 100° C. for approximately 24 hours.

EXAMPLE 9

A coin-type half-cell was fabricated by the same procedure in Example 2, except that a 5% aluminum nitrate solution prepared by adding $Al(NO_3)_3$ in water was used and the drying step was performed in an oven at about 100° C. for approximately 24 hours.

EXAMPLE 10

A coin-type half-cell was fabricated by the same procedure in Example 2, except that a 10% aluminum nitrate solution prepared by adding $Al(NO_3)_3$ in water was used and the drying step was performed in an oven at about 100° C. for approximately 24 hours.

EXAMPLE 11

One percent by weight of $B_2O_3$ was dissolved in 95 percent by weight of ethanol to prepare a boron ethoxide solution. $LiCoO_2$ powder, with an average diameter of 10 μm, was dipped into the ethoxide solution. Then they were well mixed to sufficiently react a surface of $LiCoO_2$ powder with boron ethoxide. The resulting material was dried in an oven at about 100° C. for approximately 12 hours to prepare a $LiCoO_2$ positive active material powder with $BH(OH)_2$ surface layer.

Using the positive active material, a coin-type half-cell was fabricated by the same procedure in Example 2.

EXAMPLE 12

A coin-type half-cell was fabricated by the same procedure in Example 11, except that a 5% boron ethoxide solution was used.

EXAMPLE 13

A coin-type half-cell was fabricated by the same procedure in Example 11, except that a 10% boron ethoxide solution was used.

EXAMPLE 14

A coin-cell was fabricated by the same procedure in Example 11, except that $LiMn_2O_4$ powder with an average diameter of 15 μm and coated with a 1 % boron ethoxide solution was used.

EXAMPLE 15

A coin-cell was fabricated by the same procedure in Example 11 except that $LiMn_2O_4$ powder with an average diameter of 15 μm and coated with a 10 % boron ethoxide solution was used.

EXAMPLE 16

A coin-cell was fabricated by the same procedure in Example 11 except that $Li_{1.03}Ni_{0.69}Mn_{0.19}CO_{0.1}Al_{0.07}Mg_{0.07}O_2$ coated with a 1% boron ethoxide solution was used.

EXAMPLE 17

A coin-cell was fabricated by the same procedure in Example 11 except that $LiNi_{0.9}Co_{0.1}Sr_{0.002}O_2$ coated with a 1 % boron ethoxide solution was used.

SEM Photographs of the Positive Active Materials

Figure 5A:
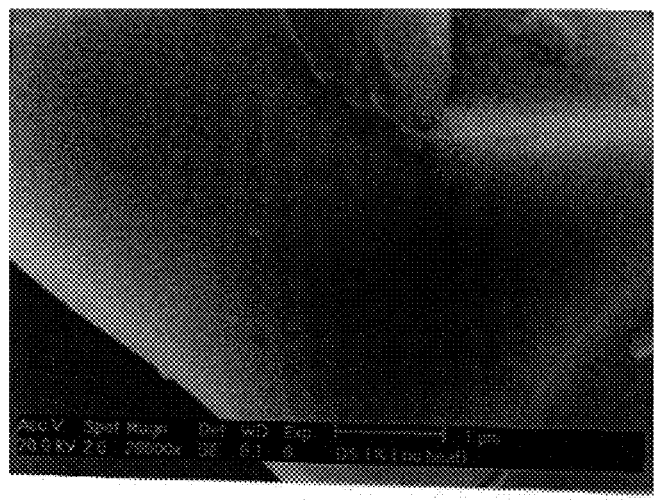
FIG. 5a is a scanning electronic microscope (SEM) view showing a surface of a positive active material according to Example 2 of the present invention.
Figure 5B:
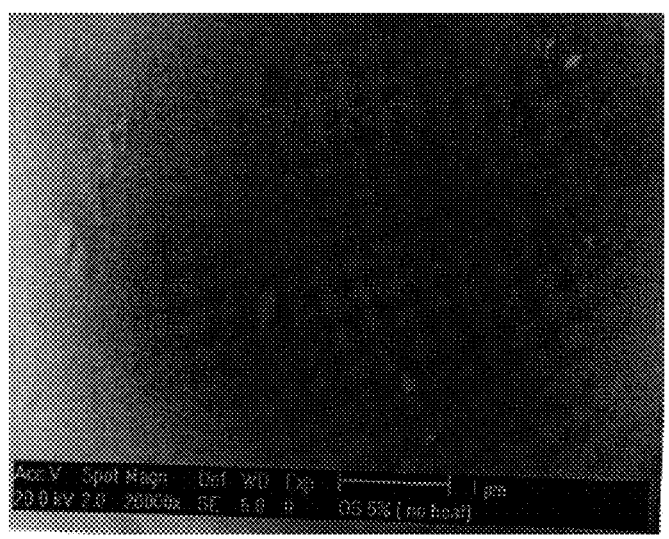
FIG. 5b is a SEM view showing a surface of a positive active material according to Example 3 of the present invention.
Figure 5C:
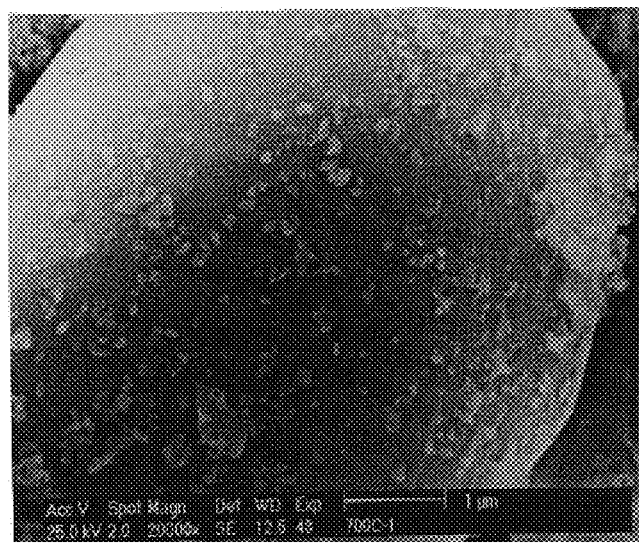
FIG. 5c is a SEM view showing a surface of a positive active material according to Comparative example 5.
Figure 5D:
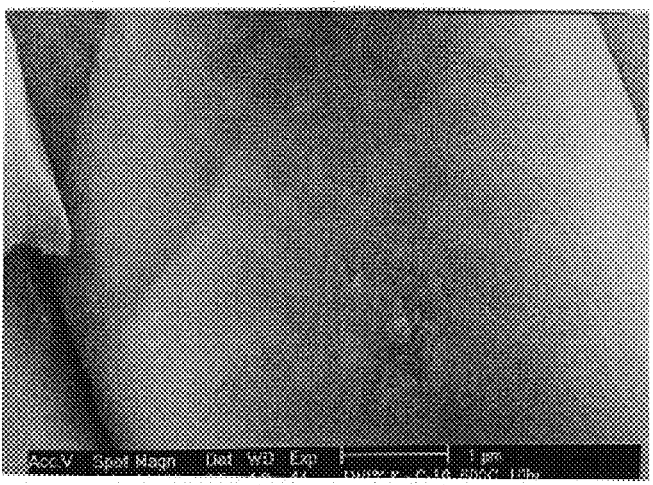
FIG. 5d is a SEM view showing a surface of a $LiCoO_2$ positive active material.

The SEM photographs of the positive active materials according to Examples 2 and 3, and Comparative example 5 are presented in FIGS. 5a, 5b and 5c, respectively. For comparison, SEM photograph of pure $LiCoO_2$ is presented in FIG. 5d. As shown in FIGS. 5a–d, the positive active materials according to Examples 2 and 3 (FIGS. 5a and 5b) have similar smooth surface to that of $LiCoO_2$ (FIG. 5d). However, the positive active material according to Comparative example 5 (FIG. 5c) has an uneven surface due to the metal oxide mass.

TEM Photographs of the Positive Active Materials

Figure 6A:
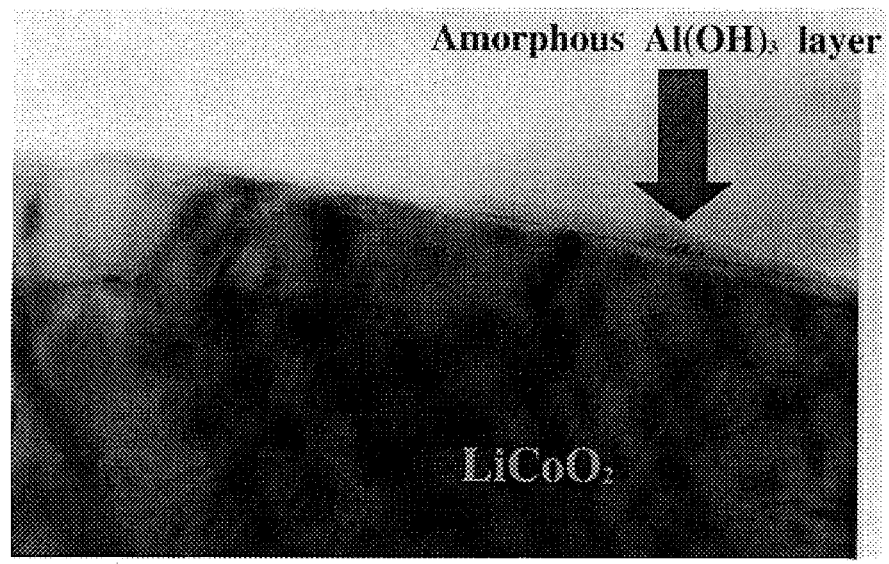
FIG. 6a is a transmission electronic microscopy (TEM) view of a positive active material for a rechargeable lithium battery according to Example 2.
Figure 6B:
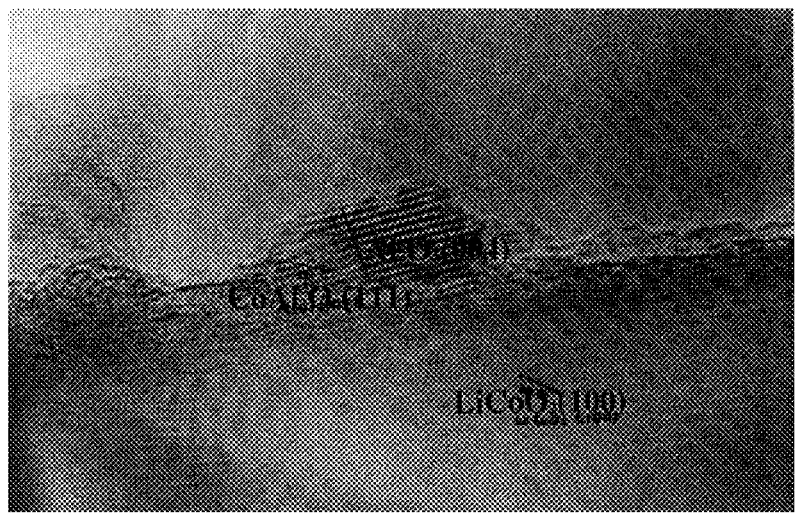
FIG. 6b is a TEM view of a positive active material for a rechargeable lithium battery according to Comparative example 5 of the present invention.

The TEM photographs of the positive active materials according to Example 2 and Comparative example 5 are presented in FIGS. 6a and 6b, respectively. FIG. 6a indicates that the positive active material according to Example 2 has an amorphous $Al(OH)_3$ surface layer, whereas FIG. 6b indicates that the positive active material according to Comparative example 5 has a Co—Al—O ($CoAl_2O_4$) surface layer and $Al_2O$ mass on the layer.

XRD Pattern of the Positive Active Materials

The XRD results of the positive active materials according to Examples 2 to 5 and Comparative example 1 are presented in FIG. 7. It was shown from FIG. 7 that the XRD patterns of the positive active materials according to Examples 2 to 5 are similar to those according to Comparative example 1. These results indicate that the surface-treatment layer may be formed without modification of the bulk chemical structure of the positive active materials.

Charge and Discharge Characteristics

Figure 8:
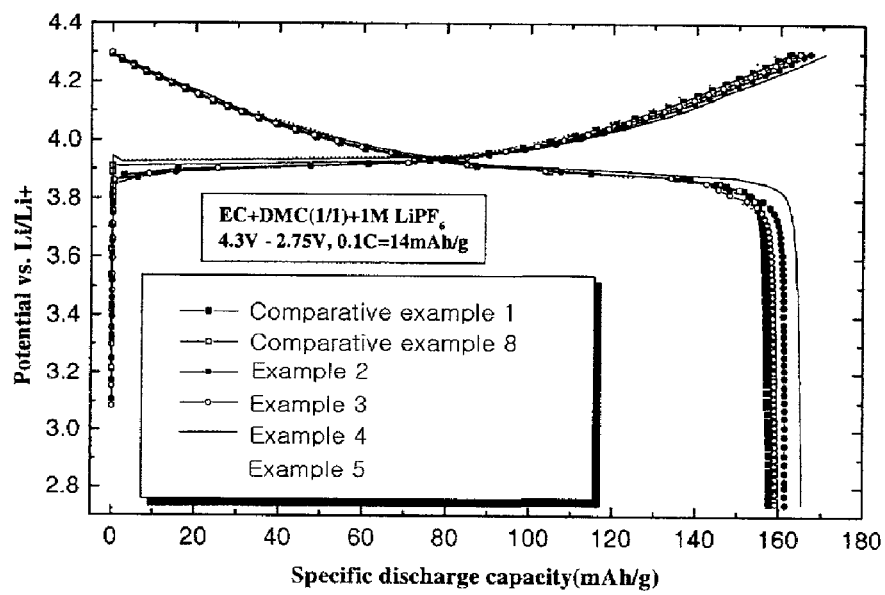
FIG. 8 is a graph illustrating the discharge characteristics at 0.1C of positive active materials according to Examples 2 to 5 and Comparative examples 1 and 8 of the present invention.
Figure 9:
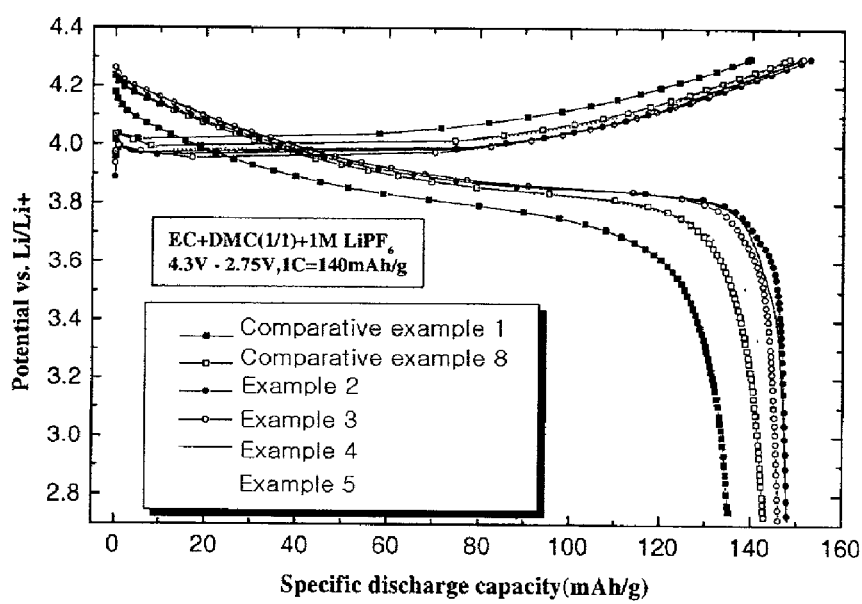
FIG. 9 is a graph illustrating the discharge characteristics at 1C of positive active materials according to Examples 2 to 5 and Comparative example 1 and 8 of the present invention.

The positive active materials according to Examples 2 to 5, and Comparative examples 1 and 8, were charged and discharged at 0.1C and 1C, respectively. The discharge characteristics thereof were measured and the results are shown in FIGS. 8 and 9, respectively. As shown in FIGS. 8 and 9, the positive active materials according to Examples 2 to 5 exhibited better discharge characteristics than those according to Comparative example 1 at a low rate and a high rate. The positive active materials according to Examples 2 to 5 exhibited slightly better discharge characteristics than those of Comparative example 8 at a low rate (FIG. 8, 0.1 C), but at high rate (1C) Examples 2 to 5 exhibited surprisingly better discharge characteristics than that of Comparative example (FIG. 9).

Cycle Life Characteristics

Figure 10:
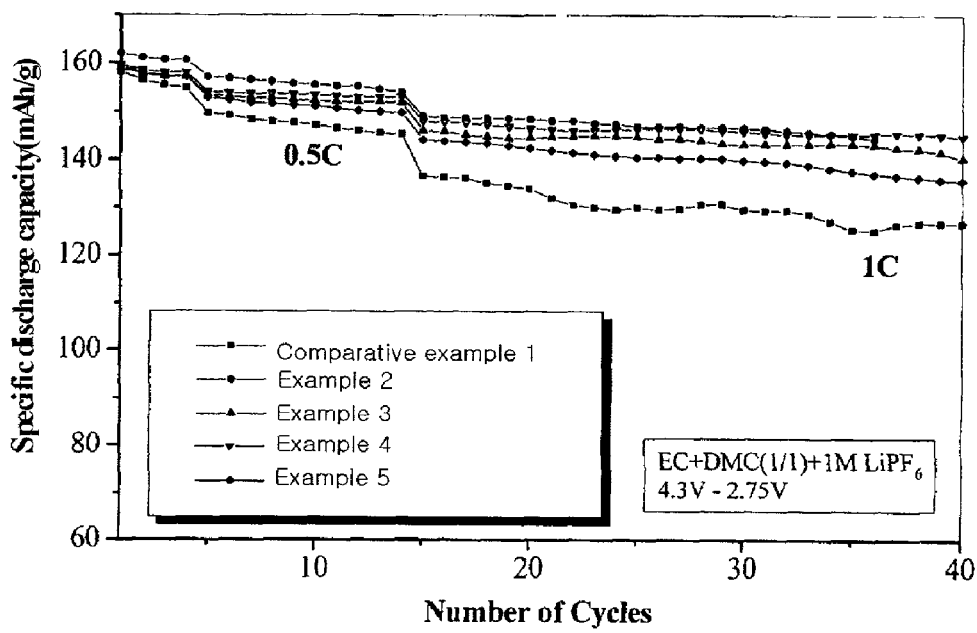
FIG. 10 is a graph illustrating the cycle life characteristics of positive active materials according to Examples 2 to 5 and Comparative example 1 of the present invention.

The cycle life characteristics of the positive active materials according to Examples 2 to 5 and Comparative example 1 were measured. While the charge and discharge rates (current density) were varied in order of 0.1C (1 cycle), 0.2C (3 cycles), 0.5C (10 cycles) and 1 C (10 cycles), the positive active materials were charged and discharged between 4.3V to 2.75V. The results are shown in FIG. 10. For easy comparison, the discharge capacity of first cycle at each rate was measured and the results are shown in Table 1.

TABLE 1

Discharge capacity according to C-rate [unit: mAh/g]

| C-rate | 0.1 C | 0.5 C | 1 C |
|---|---|---|---|
| Comparative example 1 | 159 | 150 | 137 |
| Example 2 | 162 | 157 | 152 |
| Example 3 | 159 | 154 | 152 |
| Example 4 | 164 | 159 | 149 |
| Example 5 | 159 | 153 | 145 |

As shown in Table 1, the positive active materials according to Examples 2 to 5 exhibited better cycle life characteristics than Comparative example 1.

Figure 11:
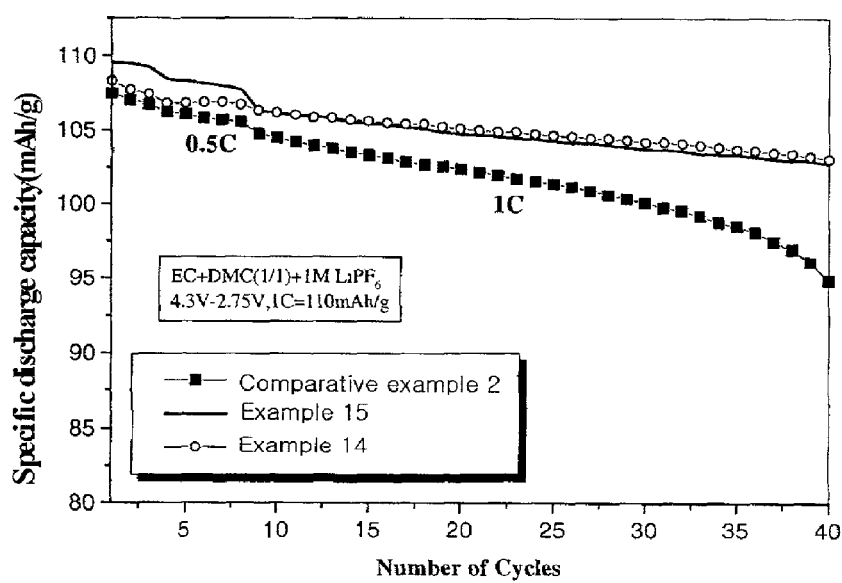
FIG. 11 is a graph illustrating the cycle life characteristics at high temperature of positive active materials according to Examples 14 to 15 and Comparative example 2 of the present invention.

The cycle life characteristics of the positive active materials according to Examples 14 to 15 and Comparative example 2 were measured by increasing C rates (0.1C, 0.2C, 0.5C and 1C) between 4.3V to 2.75V at a high temperature (60° C.). The results are shown in FIG. 11. It was shown from FIG. 11 that the initial discharge capacities of the cells according to Examples 14 to 15 were superior to that according to Comparative example 2. The cell according to Comparative example 2 exhibited abrupt discharge capacity loss after 30 cycles. On the other hand, the discharge capacities of the cells according to Examples 14 to 15 remained almost the same after 30 cycles. These good cycle life characteristics at high temperatures are achieved from $HB(OH)_2$ on the surface of $LiMn_2O_4$. $HB(OH)_2$ protects the dissociation of Mn from $LiMn_2O_4$, which results in the deterioration of the cycle life characteristics. As a result, it is expected that the positive active materials according to Examples 14 to 15 had pronouncedly reduced deterioration of the cycle life characteristics associated with the dissolution of Mn from $LiMn_2O_4$.

Average Discharge Potential

The coin-cells with the positive active materials according to Examples 2 to 5, and Comparative examples 1 and 8 were charged and discharged between 4.3V to 2.75V by varying the rates, i.e., 0.1 C (1 cycle), 0.2C (3 cycles), 0.5C (10 cycles) and 1C (10 cycles). The average discharge potential was measured and the results are presented in Table 2.

TABLE 2

Average discharge potential according to C-rate (unit: volt)

| C-rate | 0.1C | 0.5C | 1C |
|---|---|---|---|
| Comparative example 1 | 3.92 | 3.89 | 3.81 |
| Comparative example 8 | 3.92 | 3.90 | 3.86 |
| Example 2 | 3.92 | 3.91 | 3.89 |
| Example 3 | 3.92 | 3.91 | 3.88 |
| Example 4 | 3.92 | 3.91 | 3.88 |
| Example 5 | 3.92 | 3.91 | 3.87 |

As shown in Table 2, the average discharge potential of the coin cells according to Examples 2 to 5 were similar to that of Comparative example 1 at a low rate (0.1C), but they were significantly higher than that of Comparative example 1 at a high rate (1C) by 0.06V or more. Furthermore, the coin cells with the positive active material of Examples 2 to 5 had higher average discharge potential than that of Comparative example 8 with a heat-treatment step.

The positive active material according to Comparative example 8 had a surface layer including metal oxide with relatively low ionic conductivity which causes increase in the internal resistance and reduced discharge potential and power. On the other hand, the metal hydroxide-included surface-treatment layer in the positive active materials according to Examples 2 to 5 had relatively low internal resistance so that it exhibits low discharge potential drop and high discharge potential retention. Thus, it is expected that the cell with the positive active material of Example 2 to 5 exhibited good cycle life characteristics, discharge potential characteristics and improved power density.

Thermal Stability

The charge capacity of the positive active materials according to Examples 4 and 5, and Comparative examples 1 and 8 were measured and the results are shown in Table 3.

TABLE 3

| | Comparative example 1 | Comparative example 8 | Example 4 | Example 5 |
|---|---|---|---|---|
| Charge capacity [mAh/g] | 165 | 163 | 168 | 162 |
| OCV after charging [V] | 4.28 | 4.28 | 4.28 | 4.28 |

All positive active materials had charge capacities of 162 to 168 mAh/g and OCV of 4.28V.

Figure 12:
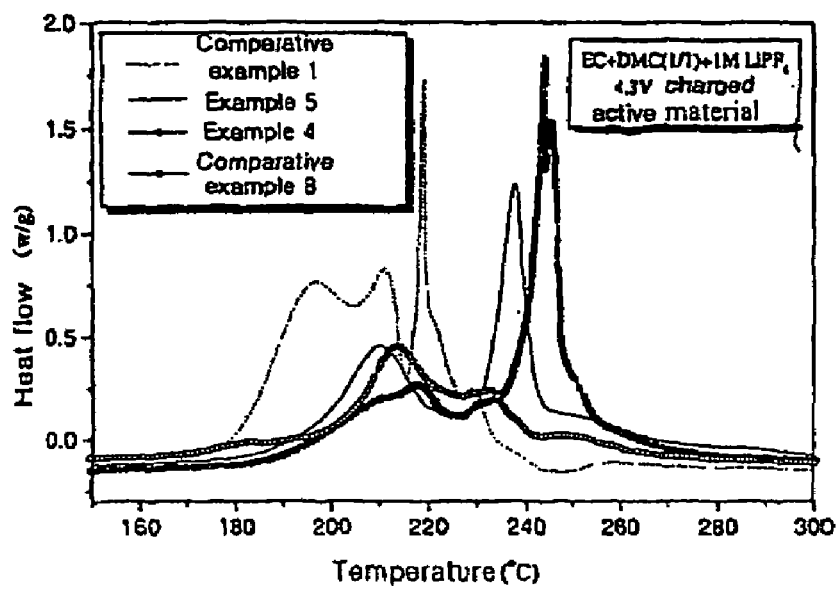
FIG. 12 is a graph illustrating the differential scanning calorimetry (DSC) results of positive active materials of Examples 4 to 5 and Comparative examples 1 and 8 according to the present invention.

The thermal stability of the positive active materials according to Examples 4 and 5, and Comparative examples 1 and 8 were evaluated according to the following procedure, and the results are presented in FIG. 12.

The positive electrode was separated from the coin cell charged to 4.3V in a dry room. About 10 mg of the positive active material was collected from the electrode and DSC analysis was performed by scanning from 25 to 300° C. with temperature increasing at a rate of 3° C./min. The results are presented in FIG. 12.

As shown in FIG. 12, $LiCoO_2$ according to Comparative example 1 exhibited a large exothermic peak in the range of about 190 to 220° C. After charging a lithium cell, a structure of a positive active material is converted from $LiCoO_2$ to $Li_{1-x}CoO_2$. Because the $Li_{1-x}CoO_2$ active material (where x equals to 0.5 or larger) is unstable, the Co—O bond in $Li_{1-x}CoO_2$ is too weak to decompose and to release $O_2$. The release of oxygen may react with an electrolyte in a cell to cause the cell to explode. The exothermic peak occurs by reacting the released $O_2$ with an electrolyte. The positive active material of Comparative example 8 had a smaller exothermic peak than that of Comparative example 1, but decomposition temperature thereof is shifted to the right (higher temperature). The positive active materials according to Examples 4 and 5 had an exothermic peak in the range of 240 to 250° C. shifted from about 190 to 220° C. As a result, the positive active materials according to Examples 4 and 5 had exothermic peaks that occurred about 30° C. higher than that according to Comparative examples 1 and 8. In addition, the peak areas of Examples 4 and 5 are dramatically smaller than that of Comparative example 1 and thus, the amount of heat evolved in Examples 4 and 5 is smaller than that of Comparative examples 1 and 8. The increase in the decomposition temperature (the oxygen released temperature) and the reduced amount of heat indicate that the positive active materials according to Examples 4 and 5 exhibited better thermal stability than that according to Comparative examples 1 and 8. Especially, the positive active material of Example 4 produced without sieving exhibits better thermal stability than that of Example 5 produced with sieving. It is believed that the aluminum oxyhydroxide (AlO(OH)) or aluminum hydroxide (Al(OH)$_3$) that remained in the positive active material of Example 4 helps to improve thermal stability.

Figure 13:
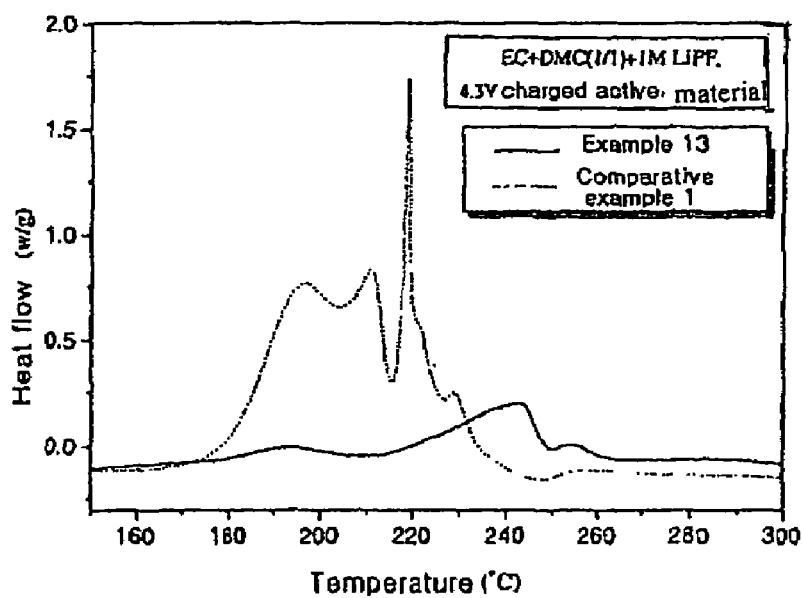
FIG. 13 is a graph illustrating the DSC results of positive active materials of Example 13 and Comparative example 1 of the present invention.

The DSC analysis of the positive active material of Example 13 was performed and the result is shown in FIG. 13. For comparison, that of Comparative example 1 is also shown in FIG. 13. In this FIGure, the positive active material of Example 13 had a decomposition temperature of 30° C. higher than that of Comparative example 1 and had smaller heat evolved than that of Comparative example 1.

Figure 14A:
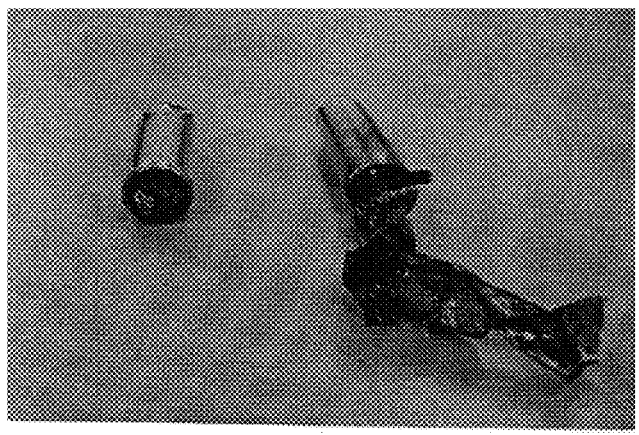
FIG. 14a is a picture of a cylindrical cell prior to and after a thermal stability test according to Comparative example 8.
Figure 14B:
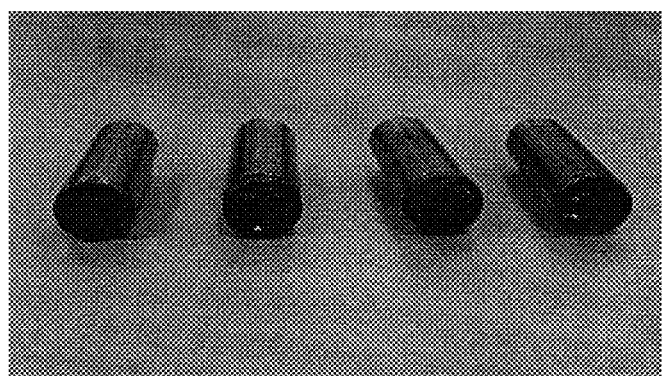
FIG. 14b is a picture of cylindrical cells prior to and after a thermal stability test according to Example 4 of the present invention.

Twenty cylindrical cells with 2000 mAh using the positive active materials according to Examples 4 to 5, and Comparative examples 1 and 8 were fabricated, respectively. The firing, the exposure to heat and the overcharge tests were performed with the eighty cells. The pictures of the cells of Comparative example 8 and Example 4 prior to and after the heat with a burner are shown in FIG. 14a to 14b, respectively. The cells of Comparative examples 1 and 8 were mostly exploded, but that of Examples 4 and 5 were not exploded. The firing test results are presented with an explosion rate obtained from the rates of numbers of exploded cells to total cells. The exposure to heat test results are obtained at the time at which the cells are exploded, which occurs when the cells are exposed to a temperature of about 150° C. The overcharge test results are obtained from leak percentages when the cells are overcharged at 1C rate. These results are presented in Table 4.

TABLE 4

|  | Comparative example 1 | Comparative example 8 | Example 4 | Example 5 |
|---|---|---|---|---|
| Explosion percentage | 100% | 70% | 0% | 0% |
| Time (average) | 10 min. | 12 min. | 18 min. | 20 min. |
| Leak percentage | 100% | 60% | 0% | 0% |

Structure of the Surface-treatment Layer

In order to identify amorphous Al(OH)$_3$ and Al$_2$O$_3$, the XRD pattern thereof were measured. The amorphous Al(OH)$_3$ and Al$_2$O$_3$ were prepared by mixing 5 g of a Al-isopropoxide solution and 95 g of ethanol and mixing them for about 3 hours to obtain clear Al-isopropoxide solution. The solution was divided into three beakers. Thereafter, the No. 1 beaker was dried at about room temperature for about 1 day (Sample 1), the No. 2 beaker was dried in an approximately 130° C. oven for about 1 day (Sample 2) and the No. 3 beaker was heat-treated in an approximately 600° C. furnace for about 1 day (Sample 3).

Figure 15:
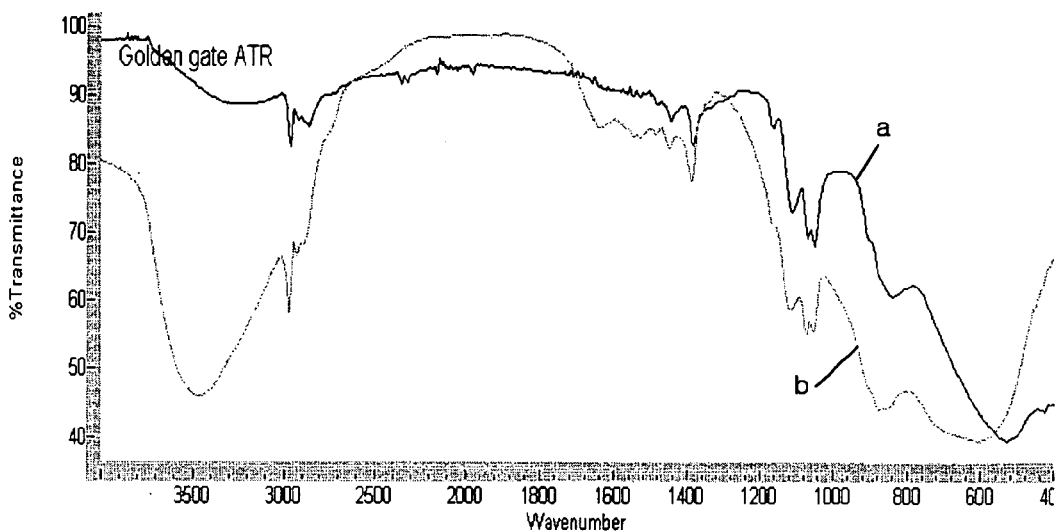
FIG. 15 is a FT-IR graph of a coating material of a positive active material of the present invention.
Figure 16:
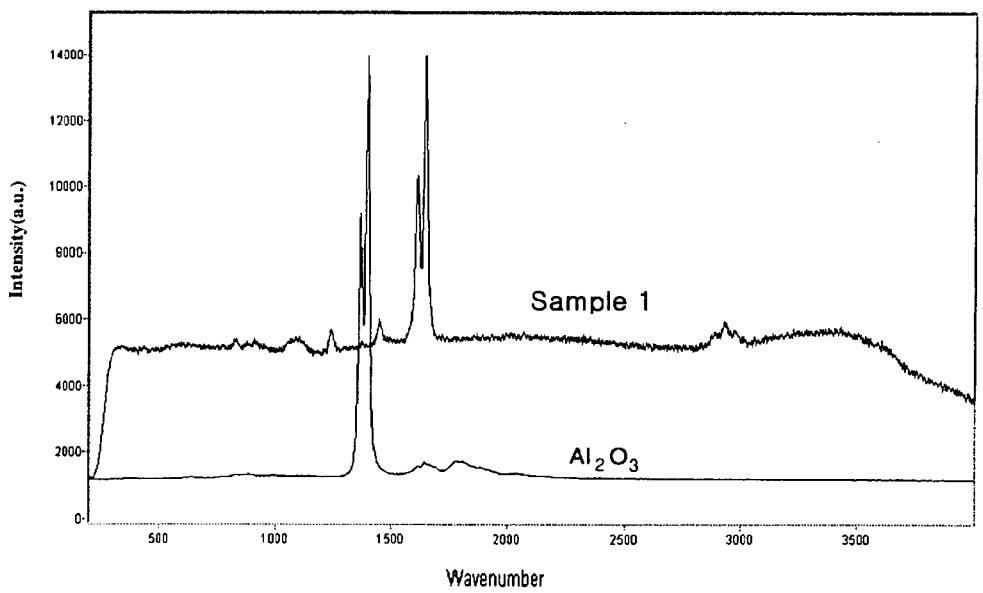
FIG. 16 is a Raman spectrum of a surface-treatment layer of a positive active material of the present invention and $Al_2O_3$.

The structure of the surface of the sample 1 powder was identified by a FT-IR analysis of a pellet mixed with the sample 1 powder and KBr. The result is shown in FIG. 15 and labeled as (a). The FT-IR result of the sample 1 powder with an ATR (Attenuated Total Reflectance) method is shown in FIG. 15 and labeled as (b). By this FT-IR result, it was deduced that the structure of the surface is AlO(OH). The Raman spectrum analysis of the sample 1 powder and Al$_2$O$_3$ were performed and the results are presented in FIG. 16. As shown in FIG. 16, the sample 2 powder had a different pattern from Al$_2$O$_3$.

Figure 17:
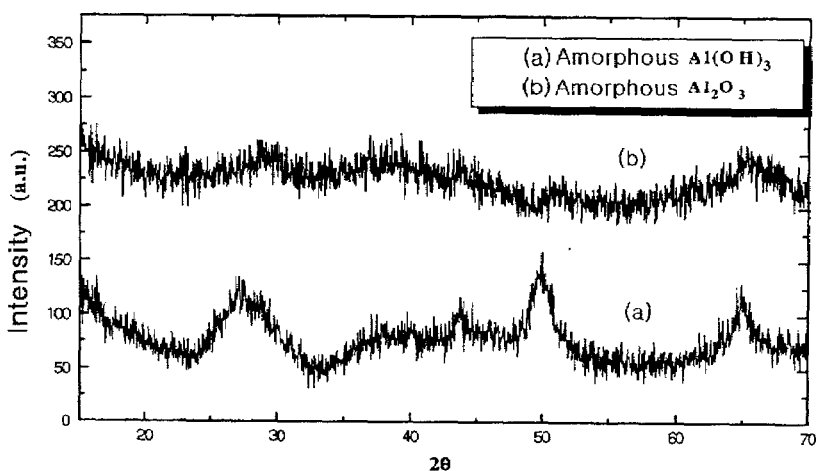
FIG. 17 is a graph illustrating the XRD pattern of $Al(OH)_3$ and $Al_2O_3$.
Figure 18:
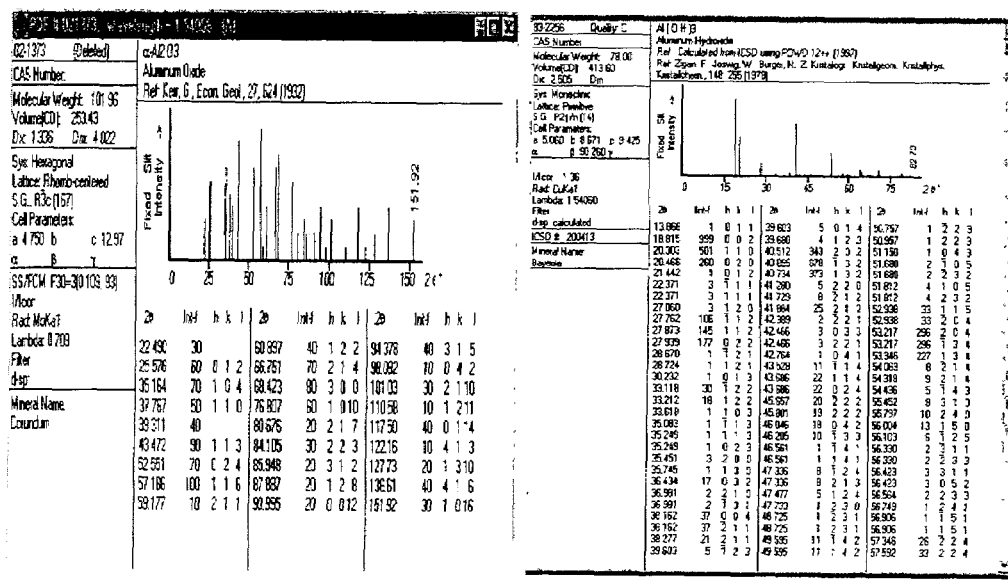
FIG. 18 is JCPDS cards of $Al(OH)_3$ and $Al_2O_3$.

The XRD patterns of the powder dried at about 130° C. (Sample 2: amorphous Al(OH)$_3$) and the powder heat-treated at about 600° C. (Sample 3: Al$_2$O$_3$) are shown in FIG. 17. It is evident from FIG. 17 that the XRD pattern of amorphous Al(OH)$_3$ is distinct from that of amorphous Al$_2$O$_3$. Both powder had amorphous patterns. It is considered that the powder dried at 130° C. is Al(OH)$_3$ presented in JCPDS No. 83-2256 and that heat-treated at 600° C. is amorphous Al$_2$O$_3$ presented in JCPDS No. 02-1373, when they are compared with the reference datum in JCPDS cards of FIG. 18. Accordingly, it is expected that the positive active materials according to Examples 1 to 10 have amorphous coating layer.

Figure 19:
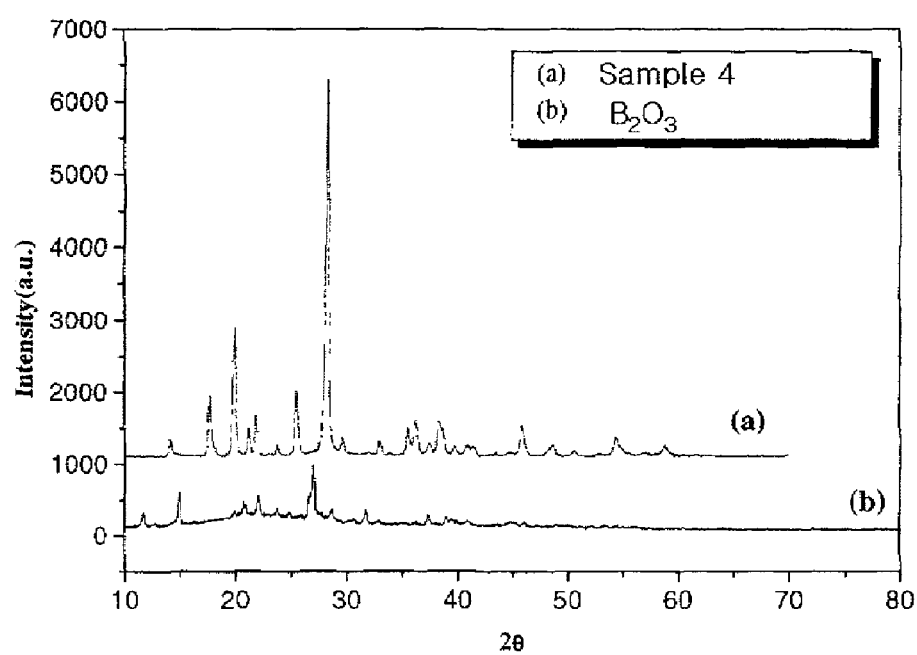
FIG. 19 is a graph illustrating the XRD pattern of coating material of a positive active material of the present invention and $B_2O_3$.

A mixture of 5 g of B$_2$O$_3$ with 95 g of ethanol was shaken for about 1 hour to prepare a clear and transparent 5% BH(OH)$_2$ solution. The solution was dried in an oven at about 100° C. for approximately 10 hours to obtain white miniscule powder (Sample 4). The XRD pattern of sample 4 and the commercial B$_2$O$_3$ are presented in FIG. 19. It is evident from FIG. 19 that the commercial B$_2$O$_3$ has no clear single phase, but the sample 4 has a clear single phase. The XRD pattern of sample 4 corresponded to JCPDS card No. 82-1067, and thus, it is crystalline hydrogen borate (HB(OH)$_2$). These results indicated that the surface of the positive active materials according to Examples 11 to 15 had a crystalline form.

In summary, the positive active material of the present invention provides rechargeable lithium battery exhibiting good cycle life characteristics, high discharge potential and high power.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A positive active material for a rechargeable lithium battery comprising:
    a core comprising a lithium-manganese or lithium-cobalt chalcogenide compound; and
    a surface-treatment layer on the core comprising $HB(OH)_2$.

2. The positive active material of claim 1 wherein the content of B of the surface-treatment layer is $2 \times 10^{-5}$ to 2 percent by weight based on the weight of the positive active material.

3. The positive active material of claim 2 wherein the content of B of the surface-treatment layer is 0.001 to 2 percent by weight based on the weight of the positive active material.

4. A positive active material for a rechargeable lithium battery, comprising:
    a core comprising at least one lithiated compound, wherein the at least one lithiated compound comprises a powder that has been heat-treated at least once with a metal source; and
    a surface-treatment layer on the core comprising at least one coating material selected from the group consisting of non-lithium hydroxides or non-lithium oxyhydroxides, the coating material comprising B.

* * * * *